April 9, 1968
O. STAHL, JR
3,376,614
FISHING ROD HOLDER
Filed Jan. 27, 1967
FIG. 1
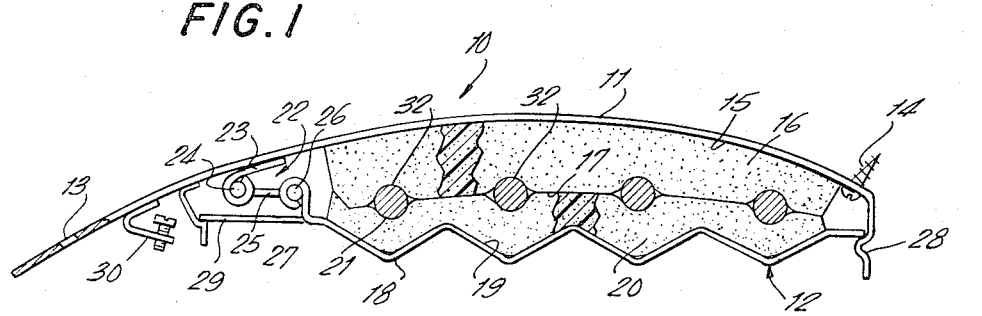
FIG. 2
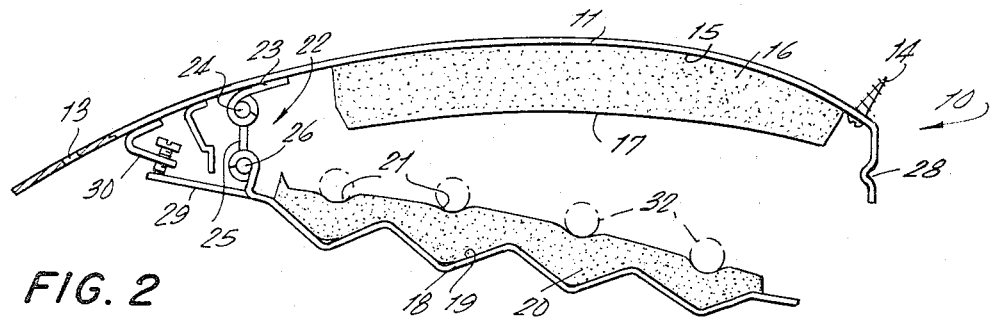
FIG. 3
FIG. 4
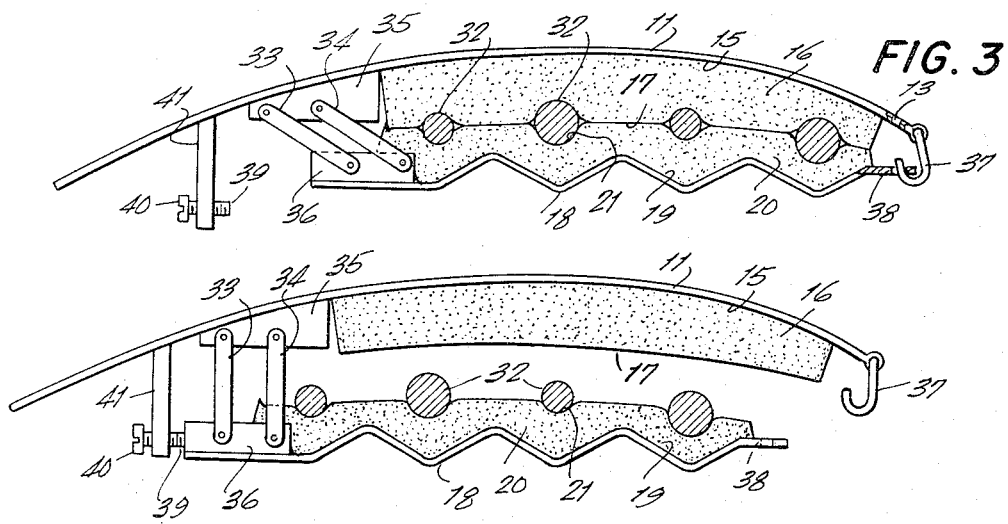
INVENTOR.
OTTO STAHL, JR.
BY *Albert H. Krosman*
ATTORNEY United States Patent Office 3,376,614
Patented Apr. 9, 1968

3,376,614
FISHING ROD HOLDER
Otto Stahl, Jr., Chatham, N.J., assignor to National Manufacturing Company, Inc., Chatham, N.J., a corporation of New Jersey
Filed Jan. 27, 1967, Ser. No. 612,155
5 Claims. (Cl. 24—81)

ABSTRACT OF THE DISCLOSURE

A fishing rod holder for attachment to vehicles having horizontal elongated clamping members swingably secured together at one end for clamping and opening purposes. A pivot linkage to permit the clamping members to be separated for loading or unloading without disturbing the horizontal orientation of the clamping members.

Background of the invention

Fishing rod holders have been made for attachment to the inside of automobile roofs or the overhead of boat cabins. Such holders often consist of a fixed and a swingable elongated clamping member, hinged together at one end and latched together at their free ends. However, in opening such devices for loading or unloading rods, the angle of the swingable member often causes the rods to tumble out of the holder. Various grooved configurations have been given to the rod receiving sockets in the clamping member to prevent this action. Such sockets are satisfactory only when a rod of conforming size is used. If the rod is substantially smaller than the socket the rod may vibrate loose. If the rod is larger than the socket it may still roll out when the holder is opened, or even prevent the holder from being latched shut.

Accordingly, it is an object of the present invention to provide a fishing rod holder which will retain the rods when in the open position.

Another object of the present invention is to provide a fishing rod holder which will accommodate a wide variety of rod sizes.

A further object of the present invention is to provide a fishing rod holder which is adjustable with respect to the amount the clamping jaws will open.

Summary of the invention

In one preferred embodiment of the present invention a fixed elongated clamping member is provided for attachment to the inside of a vehicle roof. A swingable clamping member is pivotally secured at one end to the fixed member by a linkage which permits the clamping members to separate while keeping the swingable clamping member in a substantially horizontal position. The distance the clamping members separate is adjustably set by means of a stop at the pivoting end of the holder. The lower or swingable member is of a corrugated cross-sectional shape and provided with a sponge-like material such as sponge rubber, foamed plastic or the like. The lower face of the fixed clamping member is covered with a similar material to yieldably grasp the rods.

The invention consists of the construction, combination and arrangement of parts, as herein illustrated, described and claimed.

In the accompanying drawings, forming a part hereof, there are illustrated two forms of embodiment of the invention, in which drawings similar reference characters designate corresponding parts and in which:

Brief description of the drawings

FIGURE 1 is a view in side elevation of one complete embodiment of the present invention in the closed position.

FIGURE 2 is a view similar to FIGURE 1, showing the holder in the open position, the closed position being shown in dashed lines.

FIGURE 3 is a view in side elevation of a second embodiment of the present invention in the closed position.

FIGURE 4 is a view similar to FIGURE 3 in the open position.

Description of the preferred embodiment

Referring to the drawings and particularly FIGURES 1 and 2, 10 indicates a fishing rod holder having an upper, fixed clamping member 11, and a lower swingable clamping member 12. The upper clamping member is in the form of an elongated plate of metal, curved to generally conform to the roof of a vehicle (not shown). Holes 13 are provided at each end of the member 11 to receive screws or other attaching means 14.

The inner surface 15 of the upper clamp member 11 has a length of a suitable spongy material 16 cemented or bonded thereto for most of its length to form an upper jaw. The spongy material may be sponge rubber, neoprene or any of the well known foamed plastic materials. The lower face 17 of the jaw 16 may be flat as shown in FIGURE 2 or slightly grooved to provide rod orientating surfaces.

The lower, swingable clamping member 12 is formed of an elongated strip of metal having a series of transverse corrugations 18 therein. A second length of spongy material 20 is secured to the inner surface 19 of the corrugated portion of the clamping member 12, to form a lower jaw. The spongy material 20 generally follows the contour of the corrugations to form a series of rod receiving recesses 21 as shown in FIGURE 2.

The lower clamping member is swingably secured to the upper clamping member by the pivot assembly 22 shown at the left in FIGURES 1 and 2. The pivot assembly 22 consists of a first leaf 23 secured to the inner surface 15, of the clamping member 11, as by welding. A first pivot 24 is carried by the leaf 23 adjacent the clamping member 11. A short link 25 is swingably supported by the first pivot 24 at one end and a second pivot 26, at the other end thereof. One end of the lower clamping member 12 is rigidly secured to the second pivot 26 as indicated at 27, in FIGURES 1 and 2. The free end of the lower clamping member 12 is engaged by a latch 28 which may be integral with the end of the upper clamping member 11.

When the latch 28 is moved outwardly, the lower clamping member will be released and swing from the position shown in FIGURE 1, to that shown in FIGURE 2. The pivot assembly 22 swings downwardly with the lower clamping member 12 until a small arm 29, on the clamping member 12 hits an adjustable stop 30, carried by the upper member 11. The arm 29 is held by a second latch 31, on the clamping member 11, when the holder is in the closed position. The second latch 31 must also be swung away before the lower clamping member 12 can be released.

It will be apparent from an examination of FIGURE 2 that, by reason of the pivot assembly 22, the lower clamping member 12 in the open position, is still substantially horizontal. Rods 32 which were placed within the holder, therefore, will not fall out of the recesses in the lower jaw 20, although the recesses 21 are relatively shallow.

In the closed position the spongy jaws 16, 20, are compressed and firmly hold any rods 32 which may be placed therein despite large variations in rod diameters.

Referring to FIGURES 3 and 4, there is shown a second embodiment of the present invention in which the swingable lower clamping member 12 is coupled to the fixed upper clamping member by a pair of spaced links 33, 34, swingably secured at their upper ends to a block 35 on the upper clamping member 11. The lower ends of the links 33, 34, are swingably secured to a second block 36, to which the lower clamping member 12 is fastened. The parallelogram formed by this linkage permits the lower clamping member 12 to swing from the closed position of FIGURE 3, to the open position of FIGURE 4, without changing the horizontal orientation of the lower clamping member 12. Rods 32 carried by the holder will not fall out of the recesses 21 as the holder is opened.

The embodiment of FIGURES 3 and 4 is held closed by a hook 37, swingably carried at the end of the upper clamping member 11. An opening 38 is provided in the lower clamping member 12 to receive the hook 37. By compressing the spongy jaw members 16, 20, the hook 37 can be swung away to release the lower clamping member 12.

An adjustable stop 39 is also carried by the upper clamping member 11 in this embodiment. The stop 39 is disposed in the path of the block 36 as it swings downwardly. A screw 40 is threadably carried by the body portion 41 of the stop and serves to limit the travel of the block 36, by the extent to which it extends through the stop in the direction of the block 36.

From the foregoing it will be seen that there has been provided a fishing rod holder for use inside vehicles which can carry a plurality of rods and permit their loading or unloading without danger of dropping. While only a single holder has been referred to it will be understood that two or more identical holders may be employed for very long or heavy rods.

Having thus fully described the invention, what is claimed as new and desired to be secured by Letters Patent of the United States, is:

1. A fishing rod holder comprising an elongated upper fixed clamping member, a lower elongated swingable clamping member, said lower member being transversely corrugated for the greater portion of its length, a pivot assembly interconnecting the upper and lower clamping members at one end thereof in opposed relationship, a length of spongy material on the opposed faces of the upper and lower clamping members, means for maintaining the lower clamping member in substantially horizontal orientation at all times, said means comprising at least one swingable link in said pivot assembly for maintaining the lower clamping member in substantially horizontal orientation at all times.

2. A fishing rod holder according to claim 1 in which the free ends of the clamping members are releasably secured by a latch.

3. A fishing rod holder according to claim 1 in which the pivot assembly comprises a leaf secured to the upper clamping member, a first pivot carried by the leaf, a link swingably secured to the first pivot at one end, a second pivot swingably secured to the other end of the link, said second pivot being fixedly secured to the lower clamping member.

4. A fishing rod holder according to claim 1, in which the pivot assembly comprises a first block carried by the upper clamping member, a second block carried by the lower clamping member in parallel orientation with respect to the first block, and a pair of spaced parallel links swingably supported by the first and second blocks respectively.

5. A fishing rod holder according to claim 4, in which the pivot assembly is adjustable restricted in its swing by a stop member comprising a downwardly extending body portion secured at one end to the upper clamping member, and a transverse screw threadably carried by the body portion and extending therebeyond in the direction of the second block.

References Cited

UNITED STATES PATENTS

| | | |
|---|---|---|
| 350,016 | 9/1886 | Richards. |
| 1,822,070 | 9/1931 | Vallone. |
| 1,835,632 | 12/1931 | Buhrke. |
| 2,552,293 | 5/1951 | Page et al. _____ 224—42.1 XR |
| 2,639,068 | 5/1953 | Luby et al. _____ 224—42.1 XR |
| 3,155,299 | 11/1964 | Horne et al. _____ 224—42.1 |
| 3,209,969 | 10/1965 | Hennagin _____ 224—42.41 XR |

FOREIGN PATENTS 615,064   1935   Germany.

DONALD A. GRIFFIN, *Primary Examiner.*